Figure 7:
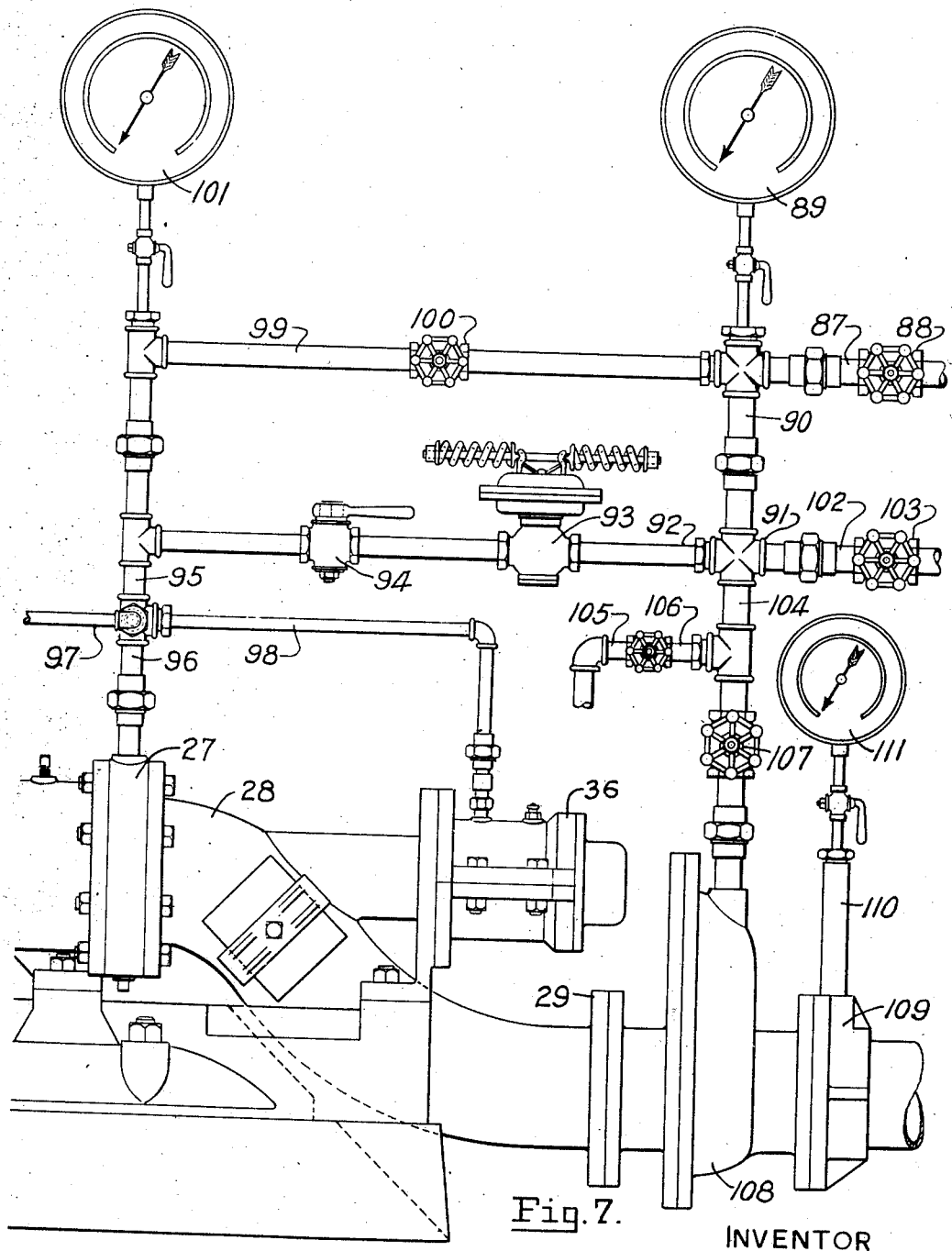

July 10, 1928.
A. G. KINYON
1,677,119
APPARATUS FOR CONVEYING PULVERIZED MATERIAL
Filed July 25, 1925 4 Sheets-Sheet 1
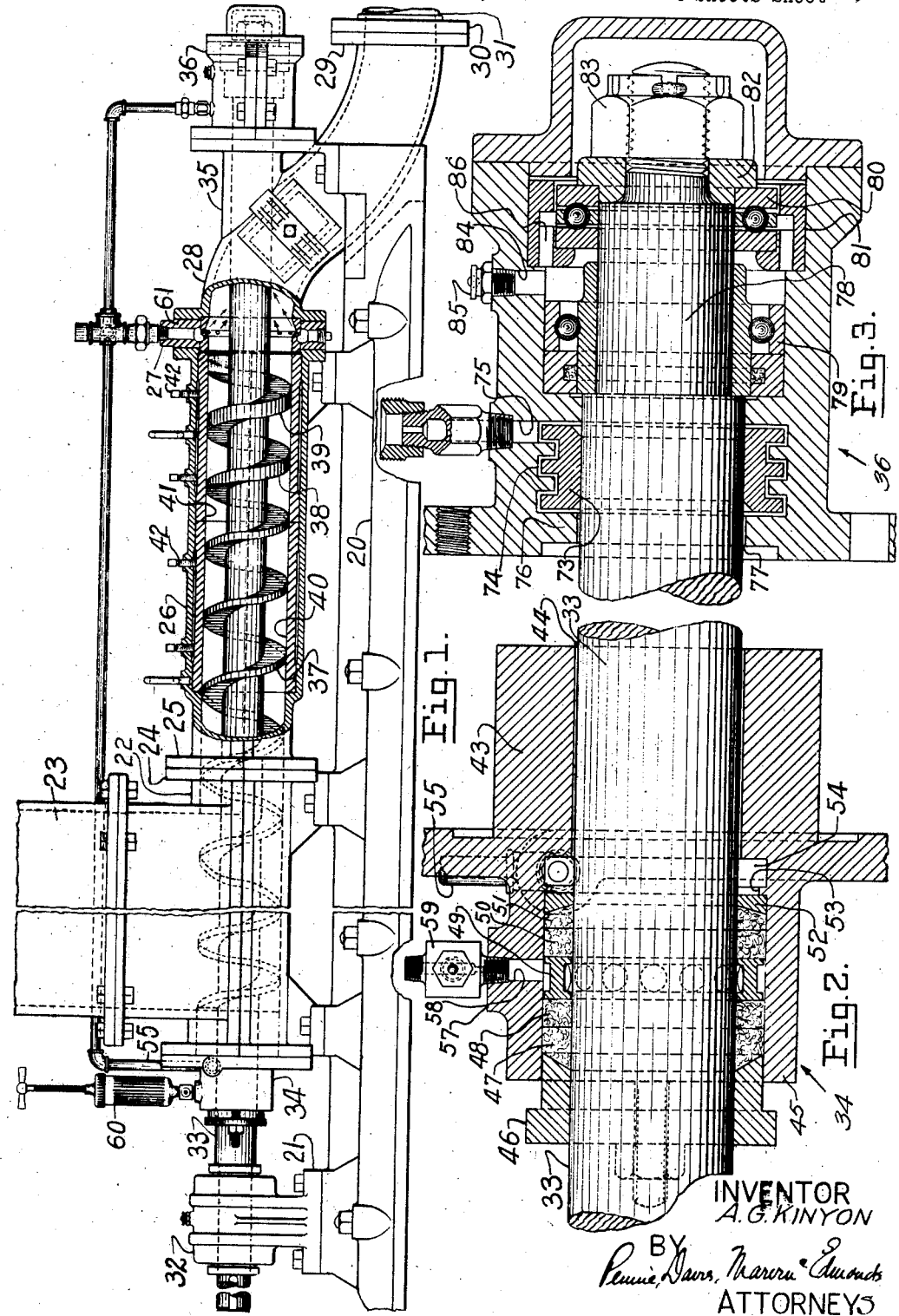
INVENTOR
A. G. KINYON
BY
Pennie, Davis, Marvin Edmonds
ATTORNEYS

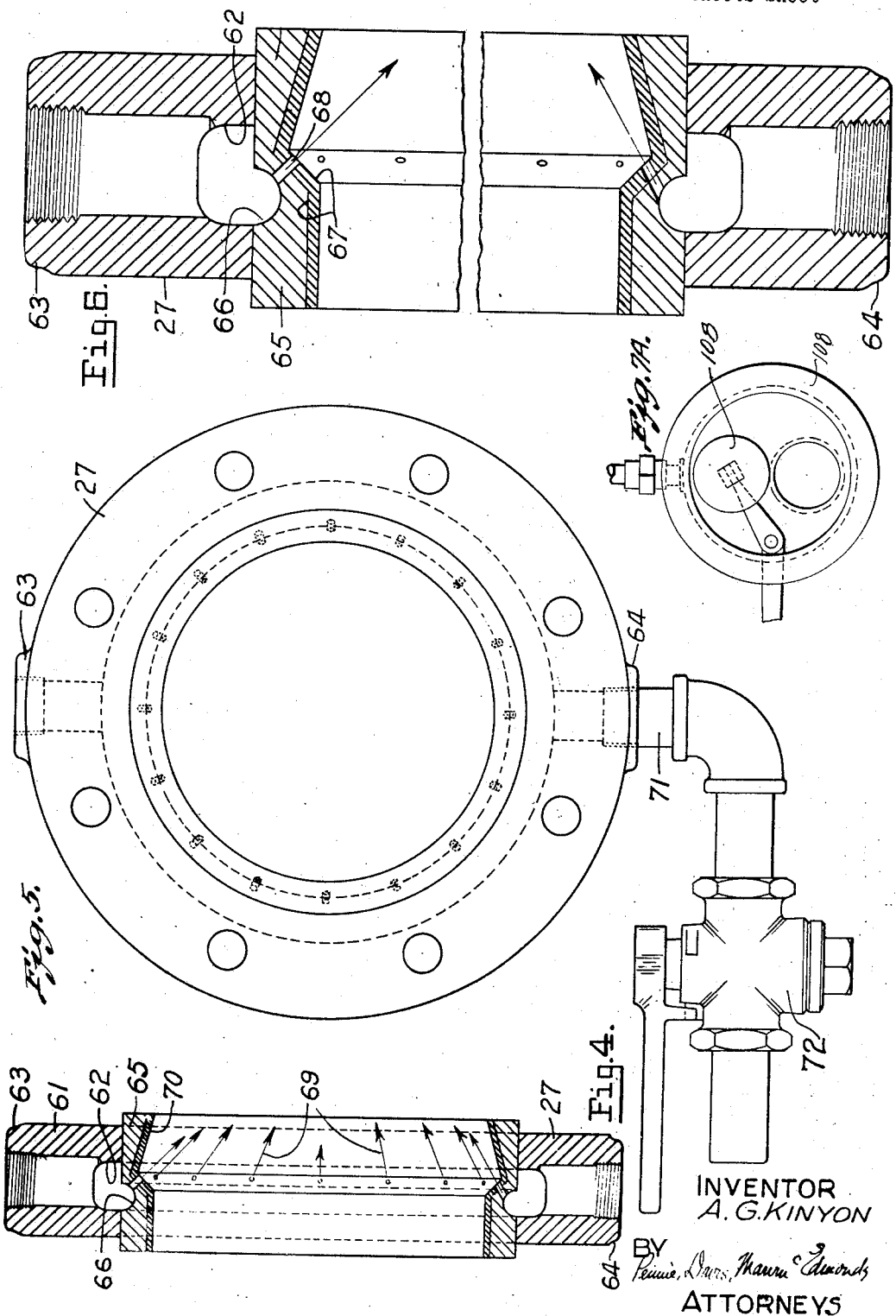

July 10, 1928.
A. G. KINYON
1,677,119
APPARATUS FOR CONVEYING PULVERIZED MATERIAL
Filed July 25, 1925     4 Sheets-Sheet 4
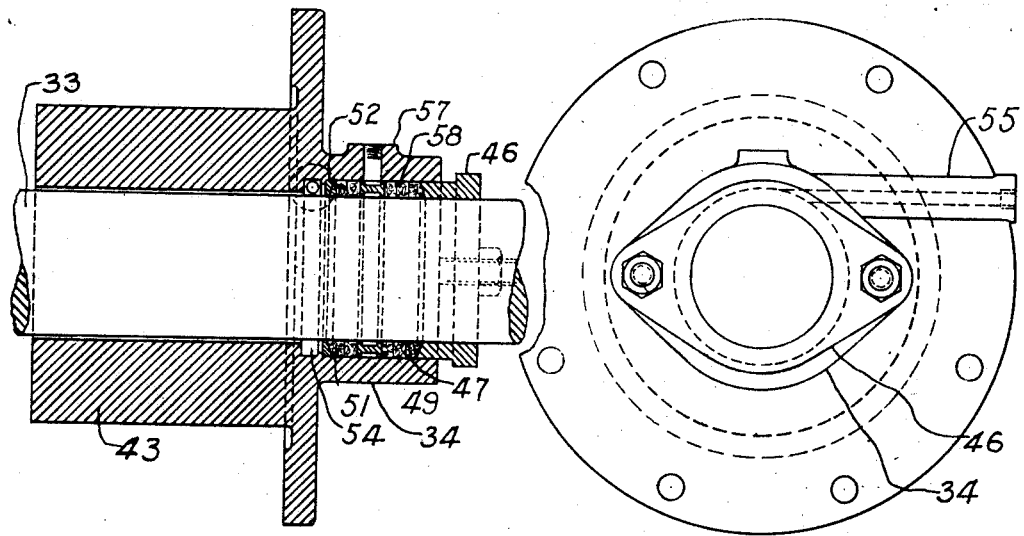
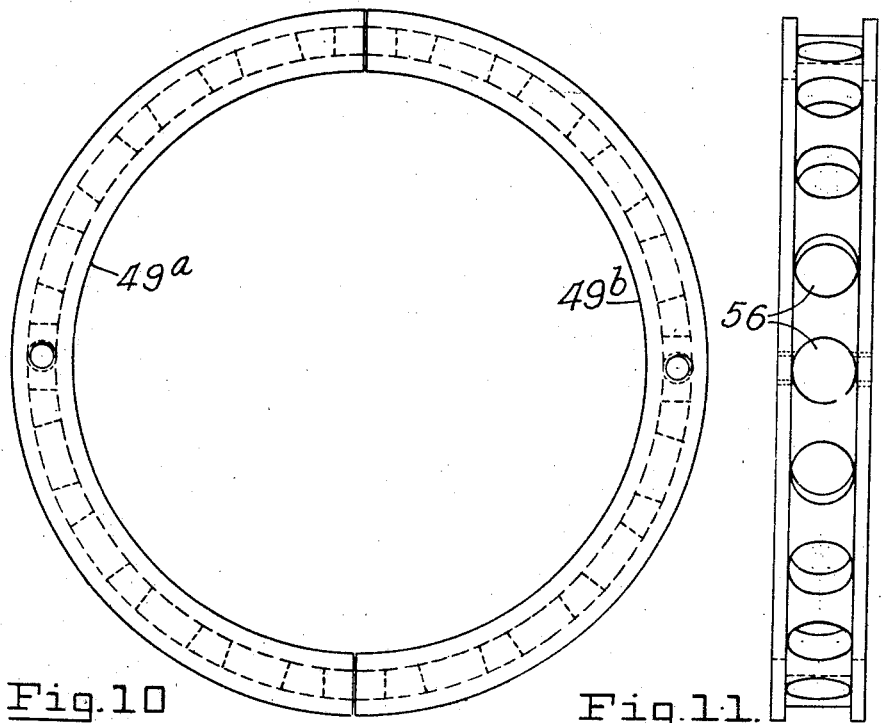
INVENTOR
A.G. KINYON.
BY
ATTORNEYS Patented July 10, 1928.

1,677,119

UNITED STATES PATENT OFFICE.

ALONZO G. KINYON, OF ALLENTOWN, PENNSYLVANIA, ASSIGNOR, BY MESNE ASSIGNMENTS, TO JAMES W. FULLER, OF CATASAUQUA, PENNSYLVANIA.

APPARATUS FOR CONVEYING PULVERIZED MATERIAL.

Application filed July 25, 1925. Serial No. 45,966.

This invention relates to the conveying of materials in a finely divided condition, or substances which, in their natural state, are in the form of small particles. Examples of such materials are pulverized fuel, raw and finished cement, soda ash, talcum powder, starch, and the like. The invention is directed particularly to an improved conveying apparatus for these and other substances of similar characteristics.

In my Patent No. 1,553,539, granted September 15, 1925, the application for which was copending herewith, I have illustrated and described a method and apparatus for conveying such materials, in which the principle of aeration of the materials is involved. Instead of conveying the materials through a transport line by the use of large quantities of air so that the materials are in suspension in the conduit, the method described in that patent depends on the fact that when air or other gas is introduced into a compact mass of finely divided material under proper conditions of pressure and volume, the material becomes sluggishly fluent and takes on the mobility of a somewhat thick liquid. Accordingly, by this method the material to be conveyed is introduced into a feeding mechanism, the delivery end of which is connected to the transport line through which the material is to be delivered to remote points. A suitable forwarding device, such as a screw conveyer, is so mounted as to discharge into the transport line and the material is forced along the line by the conveyer. At the end of the conveyer, a relatively small quantity of air under relatively high pressure is introduced into the material as the latter is moving along in confinement, and the air enters the interstices between the particles so that the mobility of the material is greatly increased. The air expands in the transport line and to some extent assists in the propulsion of the material, although the major part of such propulsion work is performed by the conveyer which exerts a steady mechanical pressure against the rear end of the column of material lying in the line.

According to this method, the aeration of the material under proper conditions results in the production of a material-air mixture which is of considerable mobility and which may be delivered in large quantities through long transport lines without excessive expenditures of power. Since the material is not conveyed in suspension and much less air is employed than in devices in which the suspension principle is used, explosive mixtures are not produced, and the material may be discharged from the transport line directly into bins or other receptacles without the necessity of first separating the suspended particles from the air.

In my patent above identified, I have described apparatus by which the method may be practiced, and while such apparatus is entirely satisfactory for all ordinary purposes, I have found that the operation of the apparatus may be somewhat improved by changes in its structure. The present invention, therefore, is directed to the provision of improved apparatus operating in accordance with the method previously described.

In the new apparatus, the material to be conveyed is introduced into conveying mechanism consisting of a casing in which is a screw conveyer. This conveyer consists of a shaft on which there is a single screw thread of improved design, the pitch of the thread decreasing toward the delivery end of the conveyer device so that the material will be somewhat compacted in its travel through the conveyer. At the end of the screw thread is an air ring which contains a plurality of apertures arranged so as to provide for the injection of air into the column of material passing from the conveyer. This ring is of improved design and provides means for injecting air into the material uniformly and under proper conditions so as to provide the desired sluggishly fluent mixture which then passes into the transport line. The new apparatus includes an improved form of conveyer screw, improved bearings for the shaft on which the screw is mounted, and also various other details which will presently be described.

For a better understanding of the invention reference will now be made to the accompanying drawings, in which Fig. 1 is a side view of the conveying mechanism or pump, certain of the parts being shown in section, Fig. 2 is a sectional view of a stuffing box employed in the new pump, Fig. 3 is a similar sectional view of the end bearing of the shaft, Fig. 4 is a sectional view of the new air ring, Fig. 5 is a front elevation of the air ring, Fig. 6 is an enlarged sectional detail of the ring, showing the manner in which the latter is constructed, Fig. 7 illustrates the compressed air connections employed in connection with the pump, Fig. 7ª is an elevational view of a stop valve, a part of the housing of which has been removed, Fig. 8 is a detail of the stuffing box illustrated in Fig. 2, being taken on a plane rotated 180° from the plane in which Fig. 2 is taken, Fig. 9 is a rear elevation of the stuffing box illustrated in Figs. 2 and 8, and Figs. 10 and 11 are front and side elevations respectively of a split grease ring employed in the stuffing box.

With reference now to these drawings, the conveying mechanism or pump is seen to consist of a base 20 of any suitable rigid construction. Secured to one end of the base is the rear bearing or pillow block 21, and mounted on the base in spaced relation to this rear bearing is a section 22 of the pump which is provided with a hopper 23 into which the material is introduced. This section is of substantially cylindrical form and is provided with an end flange 24, to which is secured a similar flange 25 on the barrel section 26. This section is also cylindrical and near its front end is mounted a ring 27 provided with a plurality of apertures through which air is introduced into the material passing out of the barrel section. The ring 27 will hereafter be designated as the air ring, and will be described later in detail. At the end of the barrel section there is attached in any suitable manner an off-set discharge section 28, flanged as at 29 at one end, to which is secured a similar flange 30, forming part of the transport line 31. The latter leads to the different receptacles to which the material is to be conveyed and may extend for long distances.

Mounted in a suitable bearing 32 in the pillow block 21 is the main drive shaft 33 which extends through a stuffing box 34 secured to the end of the hopper section, and thence through the hopper section, the barrel section, and out through a branch 35 from the discharge section, the front end of the shaft being supported in end bearing 36. This shaft carries flights 37 forming a conveyor screw. The flights are made of subsections welded to each other and to the shaft to form a continuous screw, and the flights are so formed that the screw is reduced in pitch toward the discharge end of the barrel section. Also, the terminal flights, such as 38 and 39, are considerably increased in thickness in order to resist abrasion. It has been found that in handling materials of a highly abrasive character, such as Portland cement, the heaviest abrasion takes place at the discharge end of the pump, especially in the zone which is directly in front of the air ring, and by making the terminal flights heavier, resistance to the wear is afforded. Also, these terminal flights 38 and 39 are preferably made of some material which is especially resistant to wear, as, for instance, chilled cast iron.

To overcome the abrasive effect of the material conveyed, upon the interior of the pump barrel, the latter has been formed with liner members 40 and 41. These liner members or bushings are made preferably of chilled cast iron and are ground to exact size both inside and out. Each such bushing is made up of semi-cylindrical halves and all of the parts are interchangeable so that they may be turned end for end and otherwise interchanged in position until they are completly worn out. When both ends of the first bushing are worn, for example, it may be interchanged with the rear bushing, and when one end of a bushing wears more than the other it may be turned end for end, so that the maximum wear is obtained without the necessity of renewing parts of the original apparatus. In the assembly of the parts, the bushings, which are split along their horizontal center lines, are assembled by introducing the lower halves in the lower half of the barrel; then the upper bushings are placed in position on top of them and the top half of the pump barrel is then put in place and secured in position by the usual bolts. After this is done set screws 42, provided with the usual jam nuts, which extend through the wall of the barrel section, are screwed down so as to bear against the outer faces of the bushings to hold them firmly in position. The bushings are preferably provided with countersunk portions, into which the said screws enter, and when the parts are assembled the bushings are held securely in position and act substantially as an integral part of the pump barrel.

At the rear end of the body of the pump, and encircling the shaft 33, is the stuffing box 34, shown in section in Fig. 2. This stuffing box is provided with a head 43, through which the shaft 33 passes with some clearance at 44. Extending from the end of this head is a circumferential flange 45, the end of which is clothed by a packing gland 46. Surrounding the shaft next to the packing gland are rings 47, 48, of any suitable packing material, such as fibre, and next to the ring 48 is a split grease ring 49, at the other side of which lie packing rings 50 and 51 similar to the rings 47 and 48. A split ring 52 serves as an abutment for the packing ring 51 and bears against a flange 53 inwardly extending from the flange 45.

An annular air port 54 is formed in the stuffing box just beyond the projecting flange 53, and air is supplied to this port through a pipe 55 connected to any suitable source of compressed air. As shown more clearly in Fig. 9, the pipe 55 extends tangentially from the air port, and the air flows into the air port tangentially in a direction opposite to the movement of the shaft. Thus the air is uniformly distributed about the air port, and passes out through the clearance space 44. With such an arrangement, the material which is introduced into the hopper and is to be forwarded by the pump is prevented from entering the stuffing box. An excessive air pressure is not required at this point because the material is only forced into the annular space due to the head of the material in the hopper.

With the construction of the parts so described, the packing gland may be readily removed and the various packing rings and the split grease ring taken out when inspection or repacking of the parts is required. The split ring 52 permits the cleaning of the annular air port, since as soon as this ring is out of position, access is given to the port as the stuffing box is of considerably greater diameter than the shaft so that a tool may be inserted between the stuffing box and the shaft to assist in the removal of any accumulation of material in the air space.

The grease ring 49, as shown more clearly in Figs. 10 and 11, is made of metal, usually of brass, and in two parts 49$^A$ and 49$^B$. The ring is of I-section, and a plurality of apertures 56 are formed in its central web. The ring lies normally beneath a boss 57 of the stuffing box, through which is formed a bore 58, into which is threaded a T fitting 59. A grease gun 60 may be mounted on the fitting so that grease may be forced through the bore 58 to the ring. The width of the ring is such that a part of its central web will always be opposite the bore 58, even when the packing gland is in its inmost position. A continuous supply of grease is thus supplied to the shaft at all times. The grease is delivered to the ring from the bore 58, and then passes through the apertures 56 in the ring to the space between the inner side of the web of the ring and the surface of the shaft.

The air ring shown in detail in Figs. 4 to 6 inclusive, has a body portion 61 formed of cast iron or other suitable material, having an annular port 62 extending circumferentially around it. Bosses 63 and 64 are cast with the ring and have openings communicating with the circular port 62. These bosses are placed diametrically at the top and bottom of the ring.

Within the body portion 61 of the ring is a bushing 65 which is made of steel and is pressed into the body with pressure sufficient to insure an air-tight pressure joint. This bushing has a groove 66 formed in its outer surface which registers with the port 62 so as to form the complete channel for the air. Also, the bushing 65 is formed on its inner surface with an angularly inclined shoulder 67 and there are formed in the bushing a plurality of ports 68 which extend substantially at right angles to the surface of the shoulder and communicate with the annular groove 66. These ports 68 extend generally in a radial direction, but their inclination to the axis of the ring varies, as is indicated by the arrows 69 in Fig. 4. It will be observed that the axes of the ports at the top of the ring make a greater angle with the axis of the ring itself than do the axes of the ports near the bottom of the ring. The purpose of this arrangement is to produce a more uniform distribution of air through the material, as it has been found that there is a tendency for the material to move downwardly through the discharge end of the pump.

In order to protect the inner face of the ring from the abrasive action of the material being conveyed, the inner surface of the ring, that is, the surface which is subjected to direct contact with the material, is covered by a lamination 70 of some especially hard material, preferably the metal known as stellite, which is an alloy containing chromium and cobalt, well known in the art. In making the ring this lamination is put in place as follows: The steel bushing 65 is first produced in the usual manner and the air ports 68 drilled through it in their proper locations. Carbon cores are now placed in the ports and the stellite or the metal which is to be used for the surface lamination is now puddled around the cores, as it is not possible to drill or otherwise perforate stellite by devices now in common use. As there are no working parts within the ring, the lamination need not otherwise be treated after it has been formed in position.

Since, when the pump is not in operation, the vibration of the building in which it is located is likely to shake any material which has come to rest on the inner surface of the ring through the lower ports 68 and into the annular air space extending around the bushing, such accumulation of material would in time tend to clog the lower ports as well as the air space. When the pump is put in operation this unaerated material would tend to clog the line in a solid block and would thus overload the pump and the motor. In order to overcome this difficulty, the lower boss 64 is provided with a pipe 71 having a blow-out valve 72, and before starting the pump air under pressure is admitted to the ring through the upper connection and upon opening the valve 72 any material which is accumulated in the channel is blown out through the valve 72. In the normal operation of the device the valve 72 is closed and air to be discharged through the orifices of the ring is supplied through a pipe connected with the bore in the upper boss.

As previously described, the shaft 33 extends out through a branch 35 and is supported at its outer end in a bearing 36, as shown in detail in Fig. 3. Within this end bearing there is mounted a labyrinth collar 73 on the shaft 33, which rests loosely on the shaft and moves in grooves 74 in the outer bearing casting. These grooves are somewhat larger in dimension than the flanges on the collar, and the clearances act as ducts about the shaft. The outer bearing casting is provided with a bore 75 through which air is admitted from a suitable source of supply, and the air passes into the clearances between the casting and the labyrinth, and thence out between the shaft and the flange 76 in the casting beyond the labyrinth, this flange clearing the shaft as at 77.

The air admitted through the bore 75 flows around the shaft and along it toward the barrel of the pump, and the arrangement is such that some resistance to the passage of the air is afforded, so that an even distribution of air around the shaft is provided. As the material is forced forwardly by the screw conveyer, it would have a tendency to flow along the shaft and enter the bearing, and the material is thus forced forwardly with a great pressure, due to the pushing effect of the screw. However, the flow of material is resisted by the escape of the air under high pressure flowing out through the clearance 77, and the entrance of the material into the labyrinth and thence into the bearing at the end of the shaft is thus prevented.

Beyond the labyrinth the shaft has a portion 78 of reduced diameter, provided with a radial ball bearing assembly 79, and also with a thrust bearing assembly 80, both of these assemblies being of standard type. The thrust bearing is disposed within a cup member 81 which bears against a thrust collar 82 secured on the end of the shaft by a nut 83. The outer bearing casting has a bore 84 provided with a fitting 85 through which grease may be introduced to the bearings through a plurality of bores 86 in the cup member 81, so that grease is led directly to the ball thrust bearing assembly 80. By the use of a thrust bearing at the end of the shaft toward which the material is moved by the rotation of the latter, the shaft is maintained in tension throughout its operation, and it has been found that the shaft is maintained in proper alignment and has no tendency to spring or become warped so that wear of the shaft and its housing is greatly reduced. The bearing is made air tight so as to withstand air pressure, and the bearing surfaces operate under this pressure throughout. The main bearing 32, the details of which are not shown, is provided with radial bearings similar to those employed in the end bearings, to take the radial load on the shaft.

In Fig. 7 there is shown the piping layout for the pump, the air being supplied from any suitable source through the main supply pipe 87. Air is supplied at a pressure which will vary with the needs of the particular installation and the control of the air supply is afforded by means of a globe valve 88. A pressure gauge 89 in communication with the supply pipe, indicates the pressure in the supply line.

A downwardly extending branch 90 terminates in a cross 91, from one side opening of which extends the line 92 provided with a reducing valve 93 and a plug cut-off valve 94. This line connects with a line 95 which is in turn, connected through a line 96 to the air ring, and two smaller lines 97 and 98 leading respectively to the stuffing box and the closed end bearing for providing air for the air seal which prevents the material from entering these parts of the equipment.

A by-pass line 99 is connected to the supply line 87 and also to the line 95 beyond the reducing valve 93. This line is provided with a valve 100 and a pressure gauge 101. Under normal conditions of operation the valve 100 controlling the by-pass is closed, and under such conditions the pressure of the air after having passed through the reducing valve, is indicated on the gauge 101. This gauge thus indicates pressure conditions under ordinary operation. The purpose of the by-pass is to provide a supply of air under high pressure, as received from the main supply line to the air ring without reducing the pressure of this air by passing it through the reducing valve 93. This high pressure air is conveniently used for supplying air to the air ring to clear the ports of the latter so as to prevent clogging. Also in handling certain kinds of materials, such as material which contains a higher percentage of moisture than usual, or when the air supply pressure falls below a particular value, it is frequently possible by making use of the by-pass to raise the air ring pressure somewhat above that which would ordinarily be supplied through the reducing valve. This slight increase in pressure results because of the freer passage of the air through the valve 100 than through the reducing valve, and also because there is a greater cross sectional opening through which air may flow in the by-pass.

From the cross 91 extends a line 102 controlled by a valve 103, which parallels the main transport line, connection being made to the transport line from this air line by special blow-out flanges. With such an arrangement air under high pressure may be introduced into the main transport line at intervals to blow out any accumulations which might serve to clog the line. The air line also supplies air pressure for operating various devices along the transport line, such as control valves by which material is diverted from the transport line to the receptacles.

A line 104 extending downwardly from the cross 91 has a side connection 105 controlled by a valve 106. This pipe 105 serves as a blow-out so that the system may be freed of water or accumulation of foreign matter when the air is first turned on before the pump is started. Also, in the line 104, there is a valve 107 which is normally closed. At the discharge end of the pump is a one-way, or stop valve 108, which is normally opened to permit the passage of material. This stop valve includes a disc 108' which can be swung by a suitable handle to close a passage through the valve or to open this passage. When the pump is shut down and as soon as the screw stops moving, the flow of material through the line also ceases, and unless provision is made this material which remains in the line will become de-aerated. The material settling in the line would thus present a great difficulty in restarting the pump, since it would be necessary for the motor to force the material through the small section of the pipe left open above the de-aerated material and gradually pick up and carry with it the settled material until complete aeration had been brought about. The line 104, however, is connected to the stop valve below the valve 107, and after the pump stops rotating the stop valve 108 is closed and the globe valve 107 opened, so that air under high pressure of greater volume enters the stop valve 108. The construction of the stop valve is such that when air under pressure enters it, the valve mechanism is held on its seat so that the air cannot flow into the pump, but passes into the supply part of the system and exerts pressure against the material in the main transport line so as to blow out the material into the receptacles. The large volume of air thus admitted clears a large cross sectional area of the transport line, so that when the pump is restarted no difficulty is encountered on account of the presence of de-aerated material in the transport line.

In the transport line just beyond the stop valve 108 is a blow-out flange 109, having a connection 110 in which is mounted a pressure gauge 111. The pressure gauge indicates the pressure of the material at that point, and by making use of a short length of pipe between the gauge and the flange, a considerable volume of air is trapped between the material and the operating mechanism of the gauge. The pressure existing in the conduit is thus transmitted to the gauge through the trapped air, while the material is kept out of the gauge. This particular connection must be air-tight, since otherwise the pressure of the material would cause the air to leak and the material itself would eventually enter the gauge and clog it.

The pipe connections thus provided are simple and compact, and permit the mechanism to be controlled from a single station without difficulty.

It will be seen that the new conveying apparatus involves many features of novelty, and has been designed so that the mechanism may be easily controlled, will operate efficiently, and will have a long life. This apparatus contains but a single moving part, namely the shaft with the screw thread formed upon it, and the shaft is mounted in bearings into which the entrance of material being conveyed is prevented. Also, wherever wear occurs within the pump, as, for instance, in the shell, the air ring, and the flights of the conveyer screw, provision has been made to strengthen these parts and to make them as durable as possible. The shaft is rigidly supported and by providing the off-set discharge pipe an end bearing may be used which is protected against the entrance of material and which is readily accessible. The new air ring is also designed so that it will have an indefinite life, the parts which are subjected to abrasion having been made more resistant by the use of the special alloy previously mentioned.

While this pump equipment operates in accordance with the method described in the patent above identified, the apparatus itself contains many improvements which render the apparatus more durable and less subject to wear or breakage.

I claim:

1. Apparatus for conveying pulverulent material comprising a casing, means for admitting material to be conveyed into the casing, a shaft supported for rotation within the casing, means on the shaft for advancing the material through the casing, means for admitting air under pressure into the casing beyond said advancing means to increase the mobility of the material, a bearing for the end of the shaft toward which the material is moved by said advancing means, and means independent of the bearing for supplying air under pressure to flow along the shaft into the casing, the air creating a counterflow preventing material being conveyed from being forced into said bearing.

2. Apparatus for conveying pulverulent material comprising a casing, means for admitting material to be conveyed into the casing, a shaft supported for rotation within the casing, means on the shaft for advancing the material through the casing, means for admitting air under pressure into the casing beyond the advancing means to increase the mobility of the material, a bearing for the end of the shaft toward which the material is moved by said advancing means, and means independent of the bearing for supplying air to flow along the shaft into the casing at both ends of the latter, the said means creating an air current flowing inwardly into the casing to prevent the escape of material from the casing along the shaft.

3. Apparatus for conveying pulverulent material comprising a casing, means for admitting material to be conveyed into the casing, a shaft supported for rotation within the casing, a bearing for the shaft, means on the shaft for advancing the material through the casing, means for admitting air into the casing beyond the advancing means to increase the mobility of the material, and means independent of the bearing for supplying additional air under pressure at a point between the bearing and the first air admitting means, the air supplied by said second means flowing inwardly into the casing along the shaft to create a countercurrent resisting the flow of material into the bearing.

4. Apparatus for conveying pulverulent material comprising a casing, means for admitting material to be conveyed into the casing, a shaft supported for rotation within the casing having screw flights for advancing the material through the casing, means for admitting air under pressure into the casing beyond the screw flights, a thrust bearing at one end of the casing, a stuffing box surrounding the shaft at the opposite end of the casing, and means for supplying additional air under pressure between the stuffing box and the casing and between the thrust bearing and the casing to form countercurrents flowing into the casing along the shaft to resist flow of material outwardly from the casing along the shaft.

5. Apparatus for conveying pulverulent material comprising a casing, means for admitting material to be conveyed into the casing, a shaft supported for rotation within the casing having screw flights for advancing the material within the casing, means for admitting air under pressure into the casing beyond the screw flights to increase the mobility of the material, a stuffing box surrounding the shaft at the inlet end of the casing, and means for admitting additional air under pressure around the shaft between the stuffing box and the casing to create an inwardly moving countercurrent of air to resist the flow of material into the stuffing box.

6. Apparatus for conveying pulverulent material which comprises a conveyer casing terminating in an offset discharge section, a shaft extending through the casing and the wall of the section, a thrust bearing for the end of the shaft beyond the wall of the section, means for admitting material to be conveyed into the casing, means on the shaft for propelling the material through the casing and out through the section, means for admitting air under pressure into the casing adjacent to the propelling means to increase the mobility of the material, and means for admitting additional air under pressure between the thrust bearing and the wall of the section to prevent the flow of material into the thrust bearing.

7. Apparatus for conveying pulverulent material comprising a casing terminating in an offset discharge section, a shaft extending through the casing and the wall of the section, a thrust bearing for the end of the shaft beyond the wall of the section, means for admitting material to be conveyed into the casing, a screw on the shaft for propelling the material through the casing, the screw having a progressively decreasing pitch as it approaches the discharge end of the casing, means for admitting air under pressure into the casing between the screw and the discharge section, and means independent of the thrust bearing for admitting additional air into the casing between the thrust bearing and the wall of the section to create a countercurrent of air flowing backwardly along the shaft to resist a flow of material into the thrust bearing.

8. Apparatus for conveying a pulverulent material through a pipe line comprising a casing terminating in a discharge section, means for propelling material through the casing, means for admitting air under pressure to the casing comprising a main air supply line, a connection leading from the line and opening into the discharge section to admit air under full pressure thereto, a valve in the connection for controlling the flow of air, a second connection leading through a reducing valve to the casing for admitting air under reduced pressure to increase the mobility of the material.

9. Apparatus for conveying pulverulent material through a conduit comprising a casing terminating in a discharge section, means for propelling material through the casing, means for admitting air under pressure to the apparatus comprising a main air supply line, a connection leading from the supply line and opening into the conduit, a valve in the connection for controlling the flow of air, a stop valve between the casing and the conduit, a second connection from the supply line to the casing to admit air for increasing the mobility of the material, and means in the second connection for reducing the air pressure.

10. Apparatus for conveying pulverulent material comprising a casing terminating in a discharge section, a conduit connected to the said section, means for propelling material through the casing, means for admitting air under pressure to the apparatus comprising a main air supply line, means for indicating the pressure in the supply line, a connection leading from the line to the conduit adjacent to the discharge section for admitting air under full pressure, a stop valve between the conduit and the casing for preventing the backward flow of air, a valve in the connection for controlling the admission of air to the conduit, a second connection leading from the supply line to the casing for admitting air for increasing the mobility of the material, means in the second connection for reducing the pressure of the air admitted to the casing, and means for indicating the degree of pressure of the air admitted to the casing.

11. Apparatus for conveying pulverulent material comprising a casing terminating in a discharge section, a conduit connected to the said section, means for propelling material through the casing, means for admitting air under pressure to the apparatus comprising a main air supply line, a connection provided with a valve leading from the supply line to the end of the discharge section for admitting air under full pressure to the conduit, means for indicating the pressure of the air admitted to the conduit, a stop valve between the casing and the conduit to prevent the rearward flow of air, a second connection leading through a reducing device to the casing for admitting air for increasing the mobility of the material, means for indicating the pressure of the air admitted to the casing, and means adjacent to the discharge section for indicating the pressure within the conduit.

12. Apparatus for conveying pulverulent material comprising a hollow cylindrical casing terminating in an offset discharge section, a screw shaft having flights of progressively decreasing pitch toward the discharge end, and terminal flights of increased width, for advancing and compacting the material in the casing, the shaft passing through and being supported by a thrust bearing beyond the wall of the discharge section, means for admitting compressed air to the casing beyond the terminal flights of the screw, and means for admitting additional air to the casing between the casing and the thrust bearing to create a counterflow of air moving rearwardly into the discharge section to increase the mobility of the material and to prevent a flow of material into the bearing.

13. Apparatus for conveying pulverulent material comprising a hollow cylindrical casing terminating in an offset discharge section, a screw shaft for advancing the material to be conveyed supported for rotation within the wall of the section, a bearing beyond the wall of the section for supporting the shaft, means for admitting air under pressure to the casing beyond the flights of the screw and in a forward direction, and means independent of the bearing for creating a flow of air under pressure along the shaft between the bearing and the wall of the section, the air flowing into the section and entering the material to be conveyed.

14. Apparatus for conveying pulverulent material comprising a hollow, cylindrical casing terminating in an offset discharge section, a screw shaft for advancing the material to be conveyed supported for rotation within the casing and extending through a wall of the section, a thrust bearing beyond the wall of the section for supporting one end of the shaft, means for admitting air under pressure into the casing to render the material being conveyed more fluent, means independent of the bearing for supplying additional air under pressure at a point between the bearing and the wall of the section, and means for distributing the additional air entirely around the shaft to create a counterflow of air along the shaft discharging into the section to prevent the flow of material into the bearing and to assist in increasing the mobility of the material.

15. Apparatus for conveying pulverulent material comprising a hollow cylindrical casing terminating in an offset discharge section, a screw shaft supported for rotation within the casing by a thrust bearing beyond the wall of the section, the screw having flights of progressively decreasing pitch and terminal flights of increased thickness for advancing and compacting the material within the casing, means adjacent to the terminal flights of the screw for admitting air under pressure to the casing for increasing the mobility of the material, means for admitting additional air under pressure between the thrust bearing and the section to create a counterflow of air moving backwardly along the shaft to prevent the flow of material into the bearing and to assist in increasing the mobility of the material.

16. Apparatus for conveying pulverulent material comprising a hollow cylindrical casing terminating in an offset discharge section, a screw shaft supported for rotation within the casing, by a thrust bearing beyond the wall of the section, and passing through a stuffing box at the opposite end of the casing, the screw having flights of progressively decreasing pitch and terminal flights of increased thickness for advancing and compacting the material within the casing, means adjacent to the terminal flights of the screw for admitting air under pressure to the casing for increasing the mobility of the material, means for admitting additional air under pressure between the stuffing box and the casing, and means for admitting air under pressure between the thrust bearing and the casing to create a current of air along the shaft to prevent a flow of material into the bearing and to assist in increasing the mobility of the material.

17. Apparatus for conveying pulverulent material comprising a casing, means for admitting material to be conveyed into the casing, a shaft within the casing, means on the shaft for advancing material through the casing, a thrust bearing for the end of the shaft toward which the material is conveyed by said conveying means arranged to place the shaft under tension during operation, means for supplying air under pressure to the casing beyond the advancing means to increase the mobility of the material, and means for creating a current of air flowing into the casing along the shaft between the bearing and the first air admitting means.

In testimony whereof I affix my signature.

ALONZO G. KINYON.